Oct. 3, 1967 H. E. SPINDLE 3,345,450
ELECTRIC POWER TRANSMISSION SYSTEM
Filed July 26, 1965 2 Sheets-Sheet 1
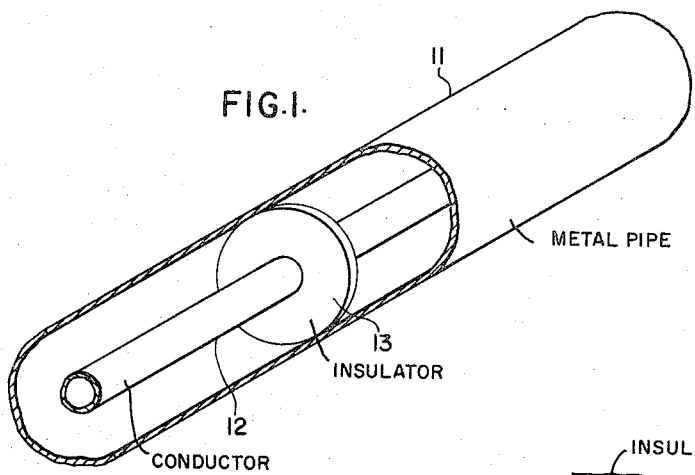
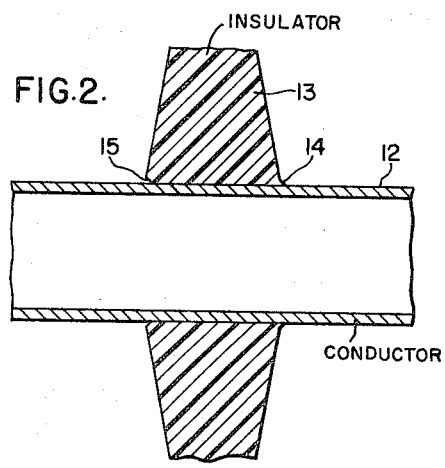
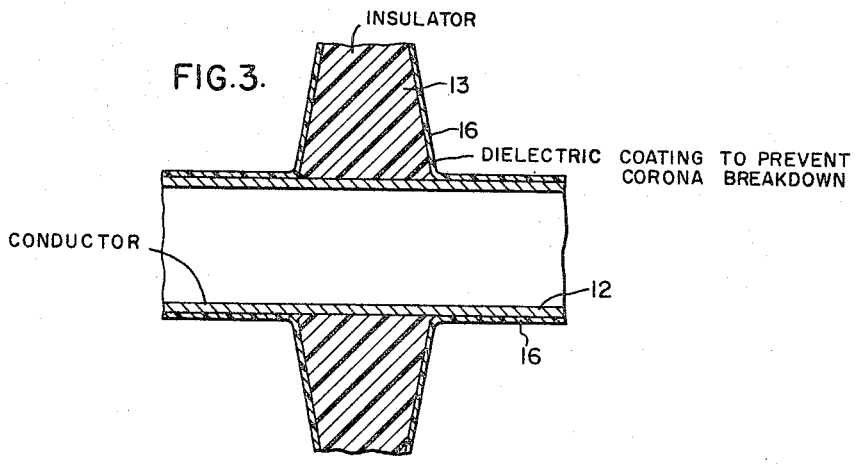
WITNESSES
Theodore F. Wrobel
James F. Young
INVENTOR
Harvey E. Spindle
BY
Willard R. Crout
ATTORNEY

United States Patent Office 3,345,450
Patented Oct. 3, 1967

3,345,450
ELECTRIC POWER TRANSMISSION SYSTEM
Harvey E. Spindle, Wilkins Township, Pittsburgh, Pa., assignor to Westinghouse Electric Corporation, Pittsburgh, Pa., a corporation of Pennsylvania
Filed July 26, 1965, Ser. No. 474,776
7 Claims. (Cl. 174—28)

This invention relates, generally, to the transmission of electric power and, more particularly, to enclosed conductors for transmitting high voltage electric power.

A pressurized gas-insulated enclosed high voltage conductor is described in a copending application Ser. No. 474,799, filed July 26, 1965, by D. L. Whitehead and assigned to the Westinghouse Electric Corporation. A cylindrical conductor is held in the center of a cylindrical pipe by generally disc-shaped insulators surrounding the conductor at spaced intervals. A high dielectric gas, such as sulfur hexafluoride, $SF_6$, at a suitable pressure provides main insulation and the insulators provide mechanical support for the conductor as well as insulation.

Many tests made on the foregoing system have shown that synthetic resins are among the best materials for the insulators. However, irregularities at the joint between the conductor and an insulator result in corona and breakdown of the insulation. Also, minute projections on the external surface of the conductor can cause corona and breakdown at high voltages.

Accordingly, an object of this invention is to provide a smooth joint between a conductor and each insulator which surrounds the conductor.

Another object of the invention is to improve the breakdown characteristics of the conductor.

A further object of the invention is to provide an unbroken surface on the conductor and insulators assembled on the conductor.

Other objects of the invention will be explained fully hereinafter or will be apparent to those skilled in the art.

In accordance with the invention, a conductor and its supporting insulators are covered with a continuous coating of plastics material having a dielectric constant similar to that of the insulator, thereby providing a smooth joint between the insulator and the conductor which will not cause corona and breakdown at the joint and also improving the breakdown characteristic of the conductor. It is desirable that the coating be flexible enough to withstand some bending during assembly of the conductor and insulators in an enclosing pipe or tube and elastic enough to permit thermal expansion of the conductor.

For a better understanding of the nature and objects of the invention, reference may be had to the following detailed description, taken in conjunction with the accompanying drawing in which:

FIGURE 1 is an isometric view, partly in section, of an enclosed conductor and insulator embodying features of the invention;

FIG. 2 is an enlarged view, in section, of a portion of the conductor and insulator showing irregularities at the joint between the conductor and the insulator before being coated with a dielectric material;

FIG. 3 is a view, similar to FIG. 2, after a coating of dielectric material has been applied to the conductor and the insulator.

Figure 4:
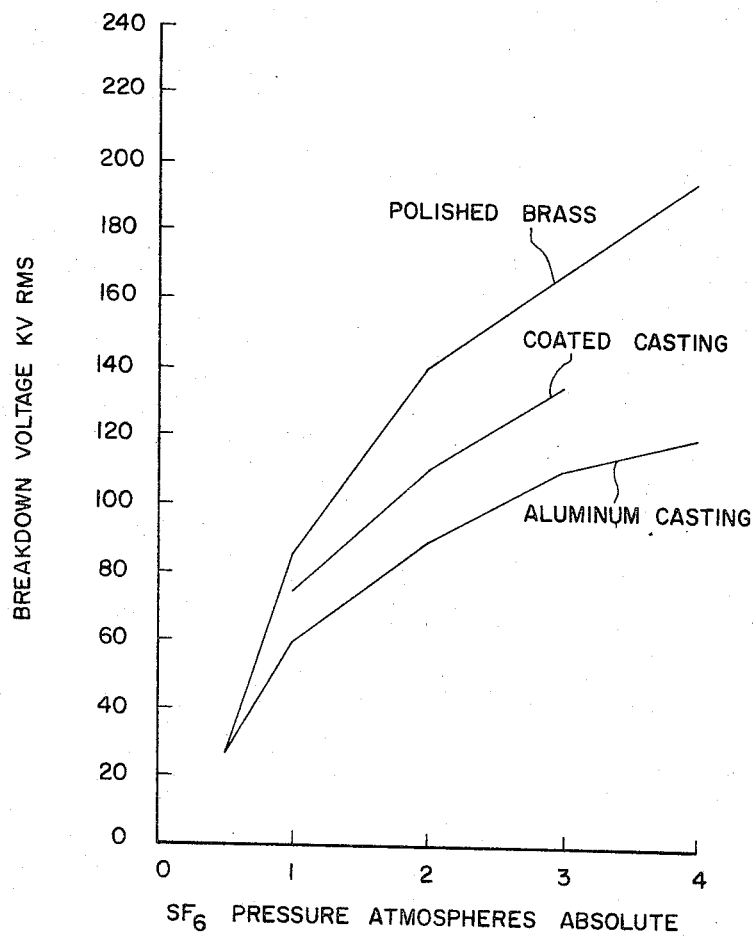
FIG. 4 is a view of curves showing results of tests of the invention.

Referring to the drawing, and particularly to FIG. 1, the electric power transmission assembly shown therein comprises a cylindrical metal pipe 11, a cylindrical conductor 12 disposed inside the pipe 11 and a plurality of generally disc-shaped insulators 13 (only one of which is shown) surrounding the conductor and spaced along the conductor at intervals to support it inside the pipe 11.

The insulators are preferably composed of a synthetic resin, but other suitable materials may be utilized if desired. Each insulator 13 may be cast around the conductor 12.

As shown in FIG. 2, imperfections or irregularities 14 and 15 may occur at the joint between the insulator and the conductor. These can cause corona and breakdown of the insulation at high voltages, for example 345 kv. and above. Also, minute projections on the outer surface of the conductor 12 can cause corona along the conductor.

In order to overcome the problem of corona a continuous coating of plastics material 16 is applied to the insulator 13 and the conductor 12 to provide an unbroken surface on the insulator and the conductor as shown in FIG. 3. Thus, a smooth joint is provided between the insulator and the conductor and a smooth surface is provided on the conductor which will improve its breakdown characteristics.

For best results, the coating material should have a dielectric constant similar to that of the insulator and should be flexible enough to withstand some bending during assembly of the conductor and the insulators in the pipe 11. Also, the material should be elastic enough to permit thermal expansion of the conductor. A suitable material is epoxy resin containing hydrated alumina, known by the trade name "Limitrak." A composition of "Limitrak" is given in U.S. Patent 3,059,044. Other suitable materials are acrylic resin, lacquer and polyethylene. The coating can be applied in any convenient way, as by brushing, spraying or dipping, so long as a smooth surface is produced.

"Limitrak" is particularly suitable for the coating material because it does not leave a carbon trail through the insulation after it is once broken down or punctured by a spark-over. Other material, such as polyethylene, leave a trail of carbon along the breakdown path, thereby eliminating the advantages of the insulating coating. Therefore, any suitable plastic is satisfactory for this application until it has broken down, but "Limitrak" has the advantage of being just as effective after a breakdown as before.

A series of tests on various methods of eliminating the low breakdown voltage caused by rough surfaces on castings have shown that coating a surface in the manner hereinbefore described improved the breakdown characteristics to within 10 to 20% of that for conductors having polished surfaces. The curves in FIG. 4 show the results of tests made on an uncoated casting, a coated casting and a polished brass conductor. Therefore, the invention helps to overcome the problem of corona on enclosed high voltage conductors.

Since numerous changes may be made in the above described construction and different embodiments of the invention may be made without departing from the spirit and scope thereof, it is intended that all matter contained in the foregoing description or shown in the accompanying drawings shall be interpreted as illustrative and not in a limiting sense.

I claim as my invention:
1. Electric power transmission means for voltages of the order of 345 kv. and above comprising a tubular pipe containing a gas having a higher dielectric strength than air and under a pressure greater than atmospheric, a tubular conductor disposed inside the pipe, a generally disc-shaped insulator surrounding the conductor to support it in the pipe, and a coating of dielectric material covering the joint between the insulator and the conductor.

2. Electric power transmission means for voltages of the order of 345 kv. and above comprising a tubular pipe containing a gas having a higher dielectric strength than air and under a pressure greater than atmospheric, a tubular conductor disposed inside the pipe, a generally disc-shaped insulator surrounding the conductor to support it in the pipe, and a coating of non-tracking dielectric material covering the joint between the insulator and the conductor.

3. Electric power transmission means for voltages of the order of 345 kv. and above comprising a tubular pipe containing a gas having a higher dielectric strength than air and under a pressure greater than atmospheric, a tubular conductor disposed inside the pipe, a generally disc-shaped insulator surrounding the conductor to support it in the pipe, and the insulator and the conductor being covered with a coating of dielectric material to provide an unbroken surface on the insulator and the conductor.

4. Electric power transmission means for voltages of the order of 345 kv. and above comprising a tubular pipe containing a gas having a higher dielectric strength than air and under a pressure greater than atmospheric, a tubular conductor disposed inside the pipe, a generally disc-shaped insulator surrounding the conductor to support it in the pipe, and the insulator and the conductor being covered with a coating of non-tracking dielectric material to provide an unbroken surface on the insulator and the conductor.

5. Electric power transmission means for voltages of the order of 345 kv. and above comprising a tubular pipe containing a gas having a higher dielectric strength than air and under a pressure greater than atmospheric, a tubular conductor disposed inside the pipe, a generally disc-shaped insulator surrounding the conductor to support it in the pipe, and the insulator and the conductor being coated with a material having a dielectric constant similar to that of the insulator.

6. An electric power transmission assembly for voltages of the order of 345 kv. and above comprising a tubular conductor, a generally disc-shaped synthetic resin insulator surrounding the conductor, said conductor being surrounded by a high-dielectric-strength gas under a greater pressure than atmospheric, and the insulator and the conductor being coated with plastics material having a dielectric constant similar to that of the insulator and somewhat resilient.

7. An electric power transmission assembly for voltages of the order of 345 kv. and above comprising a tubular conductor, a generally disc-shaped synthetic resin insulator surrounding the conductor, said conductor being surrounded by a high-dielectric-strength gas under a greater pressure than atmospheric, and the insulator and the conductor being covered with a continuous coating of plastics material to provide an unbroken surface on the insulator and the conductor.

References Cited

UNITED STATES PATENTS

| | | |
|---|---|---|
| Re. 20,244 | 1/1937 | Peterson. |
| 2,052,922 | 9/1936 | Dunsheath. |
| 2,093,114 | 9/1937 | Sonnenfeld. |
| 2,173,717 | 9/1939 | Hobart. |
| 2,221,671 | 11/1940 | Cooper. |
| 2,251,540 | 8/1941 | Bushbeck et al. |
| 2,288,899 | 7/1942 | Gits. |
| 2,304,210 | 12/1942 | Scott et al. |
| 2,510,358 | 6/1950 | Wolf _____ 174—28 |
| 3,261,906 | 7/1966 | Gee-Wah et al. _____ 174—28 |

FOREIGN PATENTS 776,637  6/1957  Great Britain.

LEWIS H. MYERS, *Primary Examiner.*

H. HUBERFELD, *Assistant Examiner.*